United States Patent [19]

Hassan

[11] 4,452,180
[45] Jun. 5, 1984

[54] INDIRECT COUNTERFLOW HEAT RECOVERY SYSTEM OF THE REGENERATIVE TYPE FOR STEAM GENERATORS, GAS TURBINES, AND FURNACES AND ENGINES IN GENERAL

[76] Inventor: Kamal-Eldin Hassan, 40 E. Blueridge Ct., New Orleans, La. 70128

[21] Appl. No.: 430,281

[22] Filed: Sep. 30, 1982

[51] Int. Cl.³ ............................................. F22B 33/00
[52] U.S. Cl. .................................. 122/1 A; 110/215; 165/104.31; 165/104.13
[58] Field of Search ............... 110/254, 215; 122/1 A, 122/31 R; 165/104.31, 104.13

[56] References Cited

U.S. PATENT DOCUMENTS

| | | | |
|---|---|---|---|
| 1,291,175 | 1/1919 | Sargent et al. | 110/215 |
| 2,136,451 | 11/1938 | Martin | 110/254 |
| 2,805,047 | 9/1957 | Lofgren | 165/104.31 |
| 3,223,860 | 12/1965 | Brill | 165/104.31 |
| 3,259,181 | 7/1966 | Ashley et al. | 165/104.31 |
| 3,623,549 | 11/1971 | Smith, Jr. | 165/104.31 |
| 3,712,026 | 1/1973 | Griffiths et al. | 165/104.31 |
| 3,897,194 | 7/1975 | Von Wiesenthal | 165/104.31 |
| 3,926,129 | 12/1975 | Wall | 110/254 |
| 4,149,453 | 4/1979 | Reed | 98/47 |
| 4,223,640 | 9/1980 | Rochford et al. | 122/1 R |
| 4,245,569 | 1/1981 | Fallon, III | 110/215 |

FOREIGN PATENT DOCUMENTS

| | | | |
|---|---|---|---|
| 1523211 | 5/1968 | France | 165/104.31 |
| 617952 | 2/1961 | Italy | 165/104.31 |
| 1006459 | 10/1965 | United Kingdom | 165/104.31 |
| 1079137 | 8/1967 | United Kingdom | 165/104.31 |

Primary Examiner—Henry C. Yuen
Attorney, Agent, or Firm—Keaty & Keaty

[57] ABSTRACT

A heat regenerator indirectly utilizes the hot gases exhausted by a furnace or engine to heat the air supply to it, through the use of heat transfer fluids which function as an efficient heat transfer medium to implementation of the counterflow and direct contact heat transfer principles.

7 Claims, 1 Drawing Figure

INDIRECT COUNTERFLOW HEAT RECOVERY SYSTEM OF THE REGENERATIVE TYPE FOR STEAM GENERATORS, GAS TURBINES, AND FURNACES AND ENGINES IN GENERAL

BACKGROUND OF THE INVENTION

1. FIELD OF THE INVENTION

The present invention relates to a heat regenerator which indirectly utilizes the hot gases exhausted by a furnace or engine to heat the air supply to it, through the use of heat transfer fluids which function as an efficient heat transfer medium due to implementation of the counterflow and direct contact heat transfer principles.

2. BACKGROUND OF THE PRESENT INVENTION

The idea of using indirect heat exchange between the exhaust gases and incoming air of a furnace through the medium of a heat transfer fluid has been previously proposed, as is representatively evidenced by U.S. Pat. Nos. 2,609,799; 2,635,587, and 2,681,047. However, in actual practice, these devices of the prior art have manifested some serious shortcomings due to their serious design limitations to which the present invention addresses itself. These air preheaters of the prior art are generally of the surface recuperative type, or of the regenerative rotary metallic-matrix type, which imposes rather severe restrictions on the general design of the furnance, as the hot exhaust gases duct, or flue, and the air intake duct must be brought to the same basic locality of the air preheater apparatus. Also, neither of these types of air preheaters can be controlled to regulate the rate or degree of heat transfer effected by the apparatus. The surface-type recuperators of the indirect type air heater of the prior art circulate the same fluid (i.e. the heat transfer medium) through coils disposed in both the exhaust gases and air intake ducts. This approach requires costly coils having large surface areas. Further, these recuperators do not utilize the counterflow principle of heat exchange, which would result in optimum heat exchange, and are therefore inefficient. Yet further, due to their inherent disability or difficulty to regulate the heat exchange process, these air preheaters have a tendency to undercool to temperatures below the dew-point temperature of the hot exhaust gases, thereby causing their metallic surfaces to be attacked by the condensing moisture, ultimately resulting in irreversible corrosion thereof, thereby necessitating replacement of the coils, which is, of course, very costly.

The present invention eliminates these and other shortcomings and disadvantages of these air preheaters of the prior art.

The present invention teaches the use of one or more heat transfer fluids circulated through one or more regenerative loops to effect indirect counterflow heat exchange between the hot gases leaving the furnace or engine and the cold air introduced to said furnace or engine to facilitate the combustion process which takes place therein. The regenerative type heat exchanger of the present invention obviates the necessity of bringing the exhaust gases duct and the intake air duct to the same locality, thereby allowing the designer complete freedom in laying out the ducts. Each of said regenerative loops comprises two recuperators and all of the necessary connecting conduits; circulating pumps or blowers; reservoirs; filters; and fittings. One of the two recuperators of each said loop is disposed in the exhaust gases duct and the other is disposed in the incoming air duct. In operation, the apparatus of the present invention basically works in the following manner:

The heat transfer fluid is circulated by means of said pumps or blowers through each said regenerative loop, thereby cooling the hot gases being exhausted through the exhaust flue of said furnace and simultaneously heating said heat transfer fluid; the now hot heat transfer fluid is then recooled by the incoming air stream, thereby simultaneously heating the incoming air stream—said heat transfer fluid is thus continuously circulated in a loop exchanging heat between the hot exhaust gases and the cold incoming air. Further, said regenerative loops are arranged in such a manner relative to each other in the two ducts so as to implement the counterflow principle of heat exchange between the exhaust gases and the incoming air. This is effected by placing said regenerative loops successively in the two ducts according to the temperature gradients in said ducts; therefore, the highest temperature loop would convey heat from the hottest gases to the hottest air, while the loop of lowest temperature conveys heat from the coolest gases to the coldest air, thereby optimizing the heat exchange process, in a manner heretofore unknown. The present invention provides, except for the loops exposed to very high temperatures, preferably, recuperators of the open type, wherein the heat transfer fluid (i.e. the heat exchange medium) is introduced into direct contact with the exhaust gas stream and the incoming air stream. Said heat transfer fluid would be jetted, sprayed, splashed, or introduced in any other suitable manner. Therefore, due to the extended interface between the heat transfer fluid and the gas and the heat transfer fluid and the air, each recuperator would be very compact, as less volume need be provided, relative to the surface-type regenerators heretofore known. After the heat transfer fluid is sprayed into the exhaust gas or incoming air stream, it is collected in a trough disposed at the bottom of each duct below each "spraying point." Just downstream of each point where said heat transfer fluid is sprayed into the gas or air stream, a suitable separator is disposed vertically across said exhaust gases duct or said incoming air duct, to effect the removal of all liquid droplets which remain suspended in the gas stream or air stream therefrom into said trough disposed beneath each recuperator at the point at which said heat transfer fluid is sprayed into the gas or air stream. The heat transfer fluid thus collected within said troughs is then delivered by pump or gravity to the other recuperator of the same loop. Said suitable separator can be an array of Z-shaped baffles, for example.

The heat transfer fluid to be used in the open, or direct-contact recuperator, such as is advocated by the present invention, should have a very low vapor pressure at its maximum operating temperature to minimize evaporation, thereby minimizing the amount of make-up fluid that need be added to replenish the supply of said heat transfer fluid. For safety purposes, the flash point of the heat transfer fluid—if it has one—should be well above the maximum operating temperature of the recuperator. Further, the vapors of such a heat transfer medium should be non-toxic in order to avoid polluting the exhaust gases released to the atmosphere. Fluids suitable for use in said regenerative loops with open-type recuperators are available with flash points up to approximately 290° C. (550° F.), for example, polyphenyl ethers. It should be noted, however, that closed or surface-type recuperators are utilized by the present invention, when necessary, especially in the loops exposed to excessively high temperatures. For these closed loops, the above restrictive conditions could be greatly relaxed: Indeed, a gas, vapor, salt, or liquid metal could be used if necessary. All recuperators of the present invention, whether of the open or surface type, could be made with any number of passes, wherein each said pass would comprise any numbers of banks, and wherein each said bank comprises application means for introducing said heat transfer fluid into the gas or air stream (e.g. an orifice having a spray nozzle mated in fluid communicating relationship thereto). Another major advantage of the present invention over the prior art is the simplicity with which it can be controlled to regulate the rate or degree of heat transfer effected by the apparatus. Some simple methods of controlling the flow rate of the heat transfer fluid (i.e. to control the heat exchange process) include the following:

a. shutting off some of said passes or recuperator banks;

b. varying said pump or blower speed, thereby regulating the flow rate at which said heat transfer fluids are circulated through said regenerative loops;

c. cutting off or throttling the circulation in one or more of said regenerative loops.

Therefore, since the rate of heat exchange varies proportionately with the flow rate of the heat transfer fluid being circulated through said regenerative loops, incidences wherein said regenerative loops will undercool to temperatures below the dew-point temperature of the hot exhaust gases, can thereby be substantially eliminated, thereby substantially preventing the possibility of the metallic surfaces of the loops being attacked by the condensing moisture, thereby ultimately preventing corrosion thereof. This precautionary feature, therefore, thereby virtually eliminates the necessity of replacing any parts of the present invention due to corrosion. An additional advantage of the present invention is that the heat transfer fluid may dissolve some of the gaseous pollutants and/or wash down any solid particles that may be held in suspension by the exhaust gases. The recuperators would thus act as washers or scrubbers of the exhaust gases and, therefore, could replace at least some parts of the pollution or emission-control equipment. It should be noted that filters would be provided in the loop through which the heat transfer fluid and the dissolved gaseous pollutants and the suspended solid particles would be conveyed, to thereby eliminate them from said heat transfer fluid.

Many other objects and advantages of the present invention will become apparent from the following detailed description when taken in conjunction with the accompanying drawings.

DETAILED DESCRIPTION OF THE PREFERRED EMBODIMENT

Figure 1:
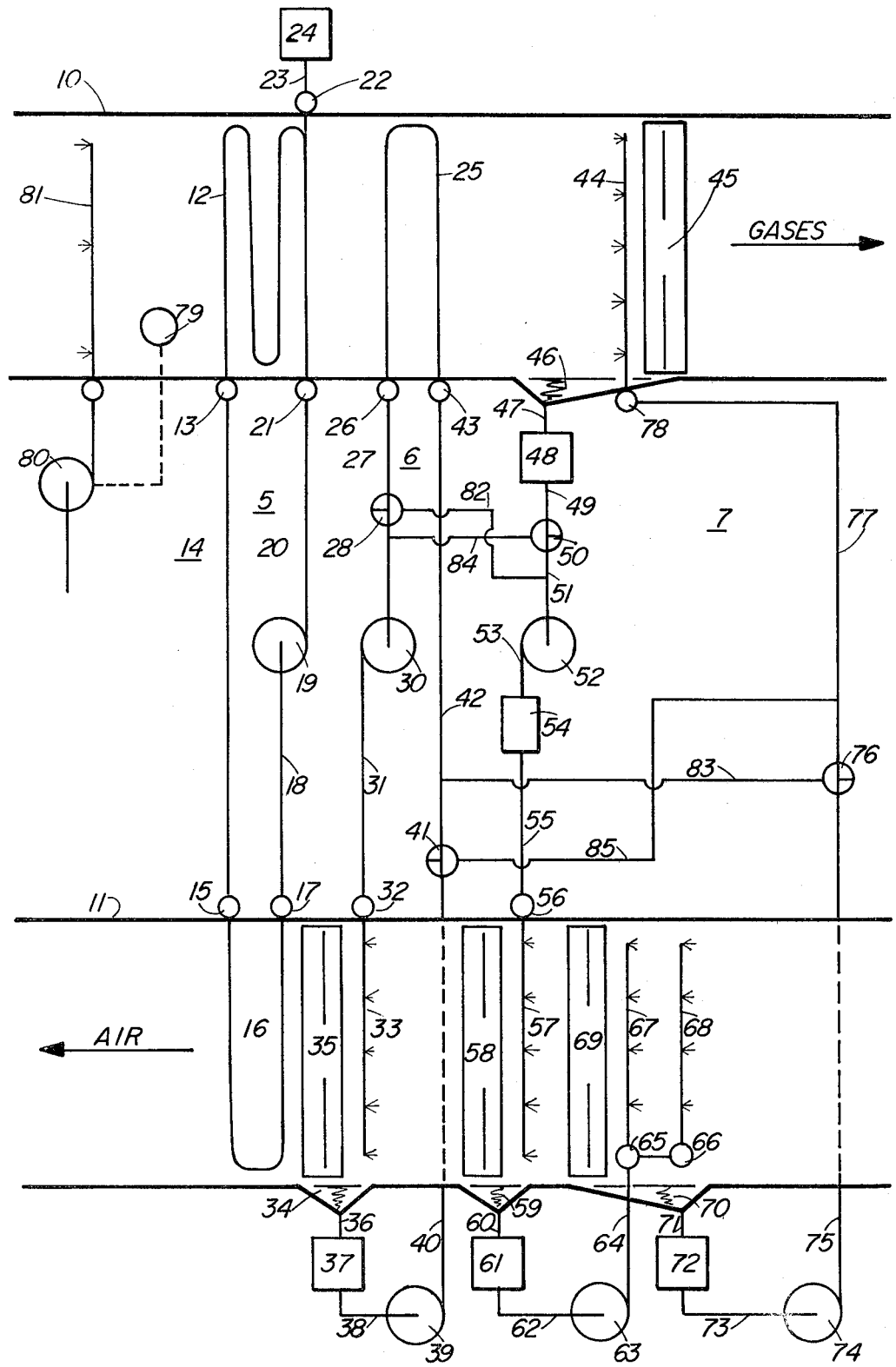
FIG. 1 illustrates an elevational, schematic view of the present invention employed in and between the exhaust gases duct and the air intake duct of a steam generator, gas turbine, or any type of furnace or engine in general.

Referring now of FIG. 1, there can be seen the heat recovery system of the present invention, shown therein employed in and between the hot exhaust gases duct 2 and the air intake duct 3 of a steam generator, gas turbine, furnace, or engine (not shown). The heat recovery system of the present invention indirectly uses the hot gases exhausted from the furnace (not shown) of a steam generator (not shown), for example, through its hot exhaust gases duct 10 to heat the air entering said furnace through air intake duct 11. Heat recovery system, in the preferred embodiment, comprises a plurality of regenerative loops, indicated generally by the numerals 5, 6, and 7, and ranged sequentially in and between the two ducts 10, 11, in a manner hereinafter described, according to the temperature gradients in each of said ducts 10, 11, thereby implementing the principle of counterflow heat exchange, as the gases having the highest temperature and exhaust gases duct 2 are indirectly used by loop 5 to heat the air having the highest temperature in air intake duct 11 (loop 5 will hereinafter be known as the highest temperature loop), and so on, so that the gases having lowest temperature in exhaust gases duct 10 are indirectly used by loop 7 to heat the air having the lowest temperature in air intake duct 11 (loop 7 will hereinafter be known as the lowest temperature loop). Each loop 5, 6, 7, comprises a first recuperator disposed in exhaust gases duct 10, and a second recuperator disposed in air intake duct 11. In the preferred embodiment shown in FIG. 1, first recuperator 12 of the highest temperature loop 5 is shown as a four-pass surface, or closed-type recuperator made of tubing, disposed substantially across exhaust gases duct 10. It should be noted that a pass is defined as each passage of the tubing of recuperator 12 substantially across duct 10. For convenience of operation, recuperator 12 is fluidly connected by means of header 22 and conduit 23 to reservoir 24, which contains one or more heat transfer fluids (not shown) to be circulated through loop 5. Since loop 5 comprises recuperators of the closed-, or surface-type, said heat transfer fluid could comprise, since it would not come into direct contact with the hot exhaust gases, any gas, vapor, soft, or liquid metal which could suitably be used as a heat transfer medium. Said heat transfer fluids are heated in first recuperator 12, thereby partially cooling the gases, and simultaneously heating said fluids, which are then collected in header 13, and conveyed by conduit 14 to header 15 of second recuperator 16 disposed in air intake duct 11, wherein said heat transfer fluids are cooled by the air flowing through air intake duct 11, thereby simultaneously heating the air to its final temperature before entering the furnace or engine (not shown). Second recuperator 16 is shown in FIG. 1 as a two-pass surface type recuperator. Said heat transfer fluid then leave second recuperator 16 via header 17, and are carried by conduit 18 to any suitable circulation means, herein shown as circulating pump or blower 19, which conveys said heat transfer fluid through conduit 20 and header 21 back to first recuperator 12 to be circulated again through loop 5.

The next regenerative loop 6 comprises a first recuperator 25, shown also as of the two-pass surface type. Loop 6 also contains a suitable heat transfer fluid which is circulated through first recuperator 25, header 26, conduit 27, three-way valve 28, conduit 29, pump 30 or blower 30, conduit 31, and header 32 to second recuperator 33 disposed in air intake duct 11. Said heat transfer fluid flowing through first recupertor 25 further partially cool the hot exhaust gases being exhausted through exhaust gases duct 10, thereby simultaneously heating said heat transfer fluid, before said fluid is conveyed via header 26, conduit 27, three-way valve 28, pipe 29, pump 30, conduit 31, and header 32 to second recuperator 33. Second recuperator 33 is shown in FIG. 1 as of the single-pass open, or direct-contact, type that sprays said heat transfer fluids into the incoming air stream of air intake duct 11. Recuperator 33, which comprises tubing, disposed at least substantially across air intake duct 11, wherein said tubing comprises a plurality of orifices fluidly communicating said tubing with the incoming air being conveyed through air intake duct 11. Said tubing of second recuperator 33 could comprise a plurality of spray nozzles (not shown) provided in fluid communication with said orifices thereof, for enhancing the injection of said heat transfer fluids into said incoming air stream. Said heat transfer fluid, which is cooled by the air, heats the incoming air, and drains into trough 34, provided at the bottom of air intake duct 11. Liquid droplets of said heat transfer fluid held in suspension in said incoming air stream are separated from the air by an array of baffles or any other suitable separator 35 that also drains into trough 34. Separator 35 is preferably disposed at least substantially across air intake duct 11 downstream of second recuperator 33, and is preferably of at least the same length as second recuperator 33. The heat transfer fluid collected by trough 34 is conveyed through sump 34 thereof and through conduit 36, receiver tank 37, conduit 38, pump 39, or blower 39, conduit 40, three-way valve 41, conduit 42, and header 43 to recuperator 25 for recirculation thereof. Make-up fluid for this loop 6 may be supplied to receiver tank 37. It is important to note that the heat transfer fluid to be used in any open, or direct-contact recuperator, and therefore in any loop having a direct-contact recuperator, such as loop 6, should have a very low vapor pressure at its maximum operating temperature to minimize evaporation and, therefore, minimize the amount of make-up liquid that need be added to replenish the supply of said heat transfer fluid. For safety purposes, the open-flash point of said heat transfer fluid—if it has one—should be well above the maximum operating temperature of the loop. Further, the vapors of the heat transfer fluid should be non-toxic to avoid polluting the exhaust gases released to the atmosphere through exhaust gases duct 10. Heat transfer fluid suitable for use in loop with open-type recuperators are available with flash-points up to about 290° C. (550° F.), for example polyphenyl ethers.

The last loop 7 shown in FIG. 1 has an open-type first recuperator 44, of the same or similar design as open-type second recuperator 33 of loop 6, that sprays heat transfer fluid into the flow of exhaust gases being conveyed through exhaust gases duct 10, thereby further cooling the exhaust gases, and simultaneously heating the heat transfer fluid. The heated fluid is drained into trough 46 provided at the bottom of exhaust gases duct 10. Also, any liquid droplets of said heat transfer fluid which are suspended in said exhaust gases are separated therefrom by separator 45 disposed at least substantially across exhaust gases duct 2 downstream of first recuperator 44, and are then drained into trough 46. All of said heated heat transfer fluid is then carried to second recuperator disposed in air intake duct 11, via conduit 47, receiver tank 48, conduit 49, three-way valve 50, conduit 51, pump 52 or blower 52, conduit 53, filter 54, conduit 55, and header 56. Filter 54 separates any solid particles that may have been held in suspension in the gas stream and washed down by the heat transfer fluid. Filter 54 may be of the duplex type having two elements disposed parallel to each other to ensure continuous operation while one filter element is removed to be cleaned. It should be noted that the heat transfer fluid sprayed into direct contact with the exhaust gases may dissolve some of the gaseous pollutants and/or wash down any solid particles that may have been held in suspension by the exhaust gases. Thus, first recuperator 44 of loop 7, and any other open-type recuperator disposed in exhaust gases duct 10, would act as washers or scrubbers of the exhaust gases and, therefore, could replace at least some parts of the pollution or emission-control equipment. Second recuperator disposed in air intake duct 11 is shown as a two-pass, two-bank open-type recuperator. The heat transfer fluid in header 56 enters the first pass 57 whereat the heat transfer fluid is sprayed into the incoming air stream and collected, together with droplets caught by separator 58, into trough 59, provided at the bottom of air intake duct 11. Said heat transfer fluid is then carried to the second pass via conduit 60, receiver tank 61, conduit 62, pump 63, or blower 63, and conduit 64 to headers 65 and 66 that feed the two banks 67 and 68 of said second pass. The sprayed heat transfer fluid, after being cooled by heating the incoming air, is collected in trough 70 provided at the bottom of air intake duct 11. Any liquid droplets of said heat transfer fluid which remains suspended in the incoming air stream is separated by separator 69 disposed at least substantially across air intake duct 11 downstream of said second pass of said second recuperator, and all liquid droplets thus separated are collected in trough 70. Said heat transfer fluid is then drained through sump 70 of trough 70 to first recuperator 44 of loop 7 via conduit 71, receiver tank 72, conduit 73, pump 74, or blower 74, conduit 75, three-way valve 76, conduit 77 and header 78 to complete loop 7 (hereinafter referred to as the lowest temperature loop).

The arrangement of the loops 5, 6, and 7 as described and shown in FIG. 1 satisfies the principle of counter-flow heat exchange. The gases at their highest temperature in the exhaust gases duct 10 indirectly heat the highest temperature incoming air being conveyed through air intake duct 3. Also, the gases of lowest temperature indirectly heat the air as it enters air intake duct 11 at its lowest temperature. In between these localities, the loops are arranged sequentially in the same manner as the two temperature gradients in the two ducts.

Another major advantage of the present invention over the prior art is the simplicity with which it can be controlled to regulate the rate or degree of heat transfer effected by the apparatus. Some simple methods of controlling the flow rate of the heat transfer fluid (i.e. in order to control the heat exchange process) include the following:

a. shutting off some of said passes and/or banks of any of said recuperators of said regenerative loops;

b. varying the pumping rate or blower rate of any of said pumps or blowers, thereby regulating the flow rate at which said heat transfer fluids are circulated through said regenerative loops;

c. cutting off or throttling, the circulation in one or more of said regenerative loops.

Further, the heat exchange rate and the temperature of said recuperators could be controlled by rearranging the direction of the heat transfer process from counter-flow to parallel flow in some loops. According to the example shown in FIG. 1, if the temperature of the heat transfer fluid in first recuperator 44 of the lowest temperature loop 7 becomes lower than the dew point temperature of the exhaust gases leaving the furnace or engine, the last two regenerative loops 6, 7 may be rearranged to effect parallel flow heat exchange, by means of employing three-way valves 28, 41, 50 and 76. These valves could be manipulated to make the higher temperature first recuperator 25 of loop 6 operate in a loop with the lower temperature second recuperator of loop 7. At the same time, the lower temperature first recuperator 44 of loop 7 would operate in a loop with higher temperature second recuperator 33 of loop 6. Three-way valves 28, 41, 50 and 76 can be automatically actuated by suitable temperature-sensitive elements, such as thermostats (not shown), suitably disposed in the exhaust gases streams within exhaust gases duct 10, so that upon the occurrence of a certain, predetermined temperature level within exhaust gases duct 10, the heat transfer fluid leaving first recuperator 25 of second loop 6 through header 26 would be diverted through conduit 27, three-way valve 28, conduit 82, conduit 51, pump 52, conduit 53, filter 54, conduit 55, header 56, first pass 57 of second recuperator of loop 7, trough 59, conduit 60, reservoir 61, conduit 62, pump 63, conduit 64, headers 65 and 66, banks 67 and 68 of second pass 91 of second recuperator of loop 7, through trough 70, conduit 71, reservoir 72, conduit 73, pump 74, conduit 75, three-way valve 76, conduit 83, conduit 42, and header 43 back to first recuperator 25 of loop 6 for recirculation thereof. Simultaneously, the heat transfer fluid leaving first recuperator 44 of loop 7 and collected in trough 46 would flow through conduit 47, reservoir 48, conduit 49, three-way valve 50, conduit 84, conduit 29, pump 30, conduit 31, header 32, through second recuperator 33 of loop 6, trough 34, conduit 36, reservoir 37, conduit 38, pump 39, conduit 40, three-way valve 41, conduit 85, conduit 77, and header 78 back to first recuperator 44 of loop 7. In this case, a liquid filter (not shown) similar to filter 54 should be placed in conduit 31, for the same reasons asigned to filter 54.

The highest temperature loop 5 may be protected from excessive high temperatures in the following manner, for example: a thermostat 79 disposed upstream of highest temperature loop 5 within exhaust gases duct 10 would actuate water pump 80 upon sensing the occurrence of a certain, predetermined temperature level of said exhaust gases. Water pump 80 would spray water through nozzles 81 to cool the hot exhaust gases to an acceptable temperature level.

While the above description of the preferred embodiment of the present invention contains many specificities, these should not be construed as limitations on the scope of the present invention, but rather as an exemplification of one embodiment thereof. Many variations are possible, for example, as regards to the number of loop, the number of passes or number of banks provided by each recuperator, the type and number of pumps or blowers in each loop, the relative position of the air intake duct 11 and the exhaust gases duct 10, etc. Accordingly, the scope the present invention should be determined, not by the embodiment illustrated, but by the appended claims and their legal equivalence.

What is claimed as invention is:

1. An indirect heat recovery system of regenerative type for use between an exhaust gases duct and an air intake duct, comprising:
   a. at least one regenerative loop, provided in fluidly connecting relationship between said exhaust gases duct and said air intake duct, and disposed successively in said ducts, wherein each of said loop comprises:
   i. a first recuperator disposed in the exhaust gases duct and a second recuperator disposed in the air intake duct;
   ii. conduit means fluidly connecting said first recuperator to said second recuperator;
   iii. at least one heat transfer media contained by said conduit means;
   iv. circulating means for circulating said heat transfer media cyclically through said conduit means, through said first recuperator, such that said media enters said first recuperator at a point adjacent to the point of exit of exhaust gases in said exhaust duct, exiting said first recuperator at a point adjacent to the point of entrance of hot exhaust gases within said entrance duct, and said second recuperator, wherein said media enters said second recuperator at a point adjacent to the point of exit of said air intake flow within said air intake induct, and said media exit said second recuperator at a point adjacent to the point of entrance of said intake gases within said air intake duct, thereby causing within said first and within said second recuperator the temperature differential between said media and said gases to remain substantially maximized throughout the media flow path within said recuperators, thereby causing maxixum effective heat transfer from said exhaust gases duct to said first recuperator and from second recuperator to said air intake duct;
   v. control means for controlling the rate of circulation of said heat transfer media cyclically through said conduit means, thereby controlling the amount of heat transferred from said exhaust gases duct to said first recuperator and from said said recuperator to said air intake duct; wherein at least one of said regenerative loops comprises a first recuperator and a second recuperator of the open type, comprising, respectively, application means for introducing said heat transfer media into direct contact with the hot gases being exhausted through said gases duct, and the application means for introducing said air stream being conveyed through said air intake duct;
   wherein each of said open type recuperator further comprises a plurality of banks each comprising a length of tubing, fluidly communication with each of said conduit means, disposed substantially in said ducts, wherein each of said banks comprises a plurality of orifices provided through the side of said tubing facing against the flow of said hot exhaust gases or said incoming air stream, fluidly communicating said tubing therewith, for thereby introducing said heat transfer media into direct contact therewith;
   wherein said open type recuperator further comprises spray nozzle means fluidly communicating each bank with the flow of said hot exhaust gases of said incoming air stream, for spraying said heat transfer media into direction contact therewith;
   wherein each said conduit means of each said loop further comprises a replacement reservoir for containing reserve supplies of heat transfer fluid for replenishing said loops;

wherein said conduit means of at least one of said regenerative loops further comprises filtering means for filtering all undesirable particulates and pollutants from said heat transfer fluids;

wherein said first recuperator and said second recuperator of each of said regenerative loops each comprises a collection means provided in fluid communication with said conduit means downstream of each of said application means, for collecting and conveying substantially all droplets of said heat transfer media which are suspended in said flow of hot exhaust gases or said stream of incoming air, through said conduit means for circulation of said heat transfer media by means of said circulation means, through said conduit means to one recuperator and back through said conduit means to the other recuperator;

wherein each of said collection means comprises a trough provided at the bottom of each of said duct beneath each of said application means, wherein each of said trough comprises a sump fluidly communicating with said conduit means;

wherein said first recuperator and said second recuperator of each of said loop each comprise separator means downstream of each of said bank and above each of said collector means for separating substantially all droplets of said heat transfer media which are suspended in said flow of hot exhaust gases and said incoming air stream therefrom, respectively, wherein each of said separation means is at least the length of each of said bank, and wherein said droplets of said heat transfer media are drained from each of said separation means into each of said collection means and conveyed through each of said sump thereof to said conduit means for circulation thereof;

wherein each said separation means comprises an array of baffles;

wherein said circulating means of each of said loop comprises throttling means for regulating the flow rate at which heat transfer media is circulated through each of said loop, thereby ultimately controlling the rate of heat exchange between said heat transfer media and said hot exhaust gases, said heat transfer media and said incoming air stream;

wherein at least two of said loops disposed successively within said exhaust gases duct and said air intake duct according to the temperature gradients in said ducts, comprise valving means for conveying said heat transfer media from the conduit means of the more downstream loop into the conduit means of the more upstream loop and vice versa, thereby indirectly implementing a parallel flow heat exchange principle to prevent undercooling of said hot exhaust gases when the temperature of said heat transfer media becomes lower than the dew-point of said gases, thereby preventing condensation of said gases on the outer surface of said first recuperator, thereby ultimately preventing corrosion thereof;

wherein it further comprises a water pump operatively associated with said highest temperature regenerative loop, said water pump comprising at least one bank, fluidly connected thereto, disposed substantially across said hot exhaust gas duct, wherein said bank(s) comprise(s) a plurality of passes provided integral to the side of said bank(s) facing against the flow of said hot exhaust gases, and wherein said water pump is actuatable upon the occurrence of the condition whereby the temperature of said hot exhaust gases exceeds a certain, preset value, to spray water through said passes of said bank(s) into said flow of hot exhaust gases, thereby cooling said exhaust gases to an acceptable temperature level.

2. The system of claim 1, wherein said valving means comprises temperature-sensing means for automatically actuating said valving means to indirectly implement the parallel flow heat exchange principle.

3. The system of claim 1, wherein said heat transfer media being circulated through said loop having recuperators of the open-type, comprise at least one liquid having a substantially low vapor pressure at the maximum operating temperature of said regenerative loops, to thereby minimize evaporation thereof and the amount of said reserve supplies of said heat transfer media.

4. The system of claim 3, wherein said liquid further has a flash point at least well above the maximum operating temperature of said regenerative loops, having recuperators of the open-type, thereby maximizing the safety of the operation of said heat recovery system.

5. The system of claim 3, wherein said liquid has vapors which are non-toxic to avoid polluting the exhaust gases released to the atmosphere through said hot exhaust gas duct.

6. The system of claim 3, wherein said liquid comprises polyphenyl ethers.

7. The system of claim 1, wherein said heat transfer media introduced through said application means of said open-type first recuperators, further acts to dissolve at least some of the gaseous pollutants and wash down any solid particles held in suspension by said exhaust gases, said heat transfer fluids of said open-type first recuperators thus acting as washers/scrubbers of said exhaust gases, thereby replacing at least some part of the pollution or emission-control equipment.

* * * * *